(12) United States Patent
Wood (10) Patent No.: US 8,236,177 B1
(45) Date of Patent: Aug. 7, 2012

(54) SPIRAL WOUND FILTER

(76) Inventor: Brian Wood, Prospect, KY (US)

( * ) Notice: Subject to any disclaimer, the term of this patent is extended or adjusted under 35 U.S.C. 154(b) by 1005 days.

(21) Appl. No.: 12/174,720

(22) Filed: Jul. 17, 2008

Related U.S. Application Data (60) Provisional application No. 60/950,930, filed on Jul. 20, 2007, provisional application No. 60/953,586, filed on Aug. 2, 2007.

(51) Int. Cl.
*B01D 63/10* (2006.01)

(52) U.S. Cl. ......... 210/321.74; 210/321.6; 210/321.83; 210/450; 210/457; 210/493.2; 210/493.4; 210/497.1

(58) Field of Classification Search ............... 210/321.6, 210/321.74, 321.75, 321.76, 321.83, 321.84, 210/321.85, 450, 453, 454, 493.4, 457, 493.2, 210/497.1
See application file for complete search history.

(56) References Cited

U.S. PATENT DOCUMENTS

| | | | | |
|---|---|---|---|---|
| 4,814,079 A | * | 3/1989 | Schneider | 210/321.83 |
| 6,153,098 A | | 11/2000 | Bayerlein et al. | |
| 6,632,356 B2 | * | 10/2003 | Hallan et al. | 210/321.6 |
| 6,755,970 B1 | | 6/2004 | Knappe et al. | |
| 7,410,581 B2 | * | 8/2008 | Arnold et al. | 210/321.85 |

* cited by examiner

*Primary Examiner* — John Kim
(74) *Attorney, Agent, or Firm* — Camoriano and Associates; Theresa Fritz Camoriano

(57) ABSTRACT

A spiral wound filter is formed which decreases the cross-sectional area over which the feed fluid flows in order to provide sufficient flow rates across the membrane with less energy consumption, and one embodiment includes a housing that is sealed against substantially the entire outer surface of the filter element.

14 Claims, 11 Drawing Sheets

PRIOR ART

SPIRAL WOUND FILTER

BACKGROUND

This application claims priority from U.S. Provisional Application Ser. No. 60/950,930, filed Jul. 20, 2007 and from U.S. Provisional Application Ser. No. 60/953,586, filed Aug. 2, 2007, which are hereby incorporated herein by reference. The present invention relates to cross flow filtration, which, depending upon the pore size of the filter media, includes reverse osmosis, nanofiltration, ultra filtration, and microfiltration.

SUMMARY

In one embodiment, a membrane configuration is disclosed which includes tortuous flow paths for the feed stream, resulting in higher flow velocities across the membrane for a given feed flow rate.

In another embodiment, a filter housing is disclosed which substantially reduces the possibility of internal seal failures.

DESCRIPTION

Figure 1:
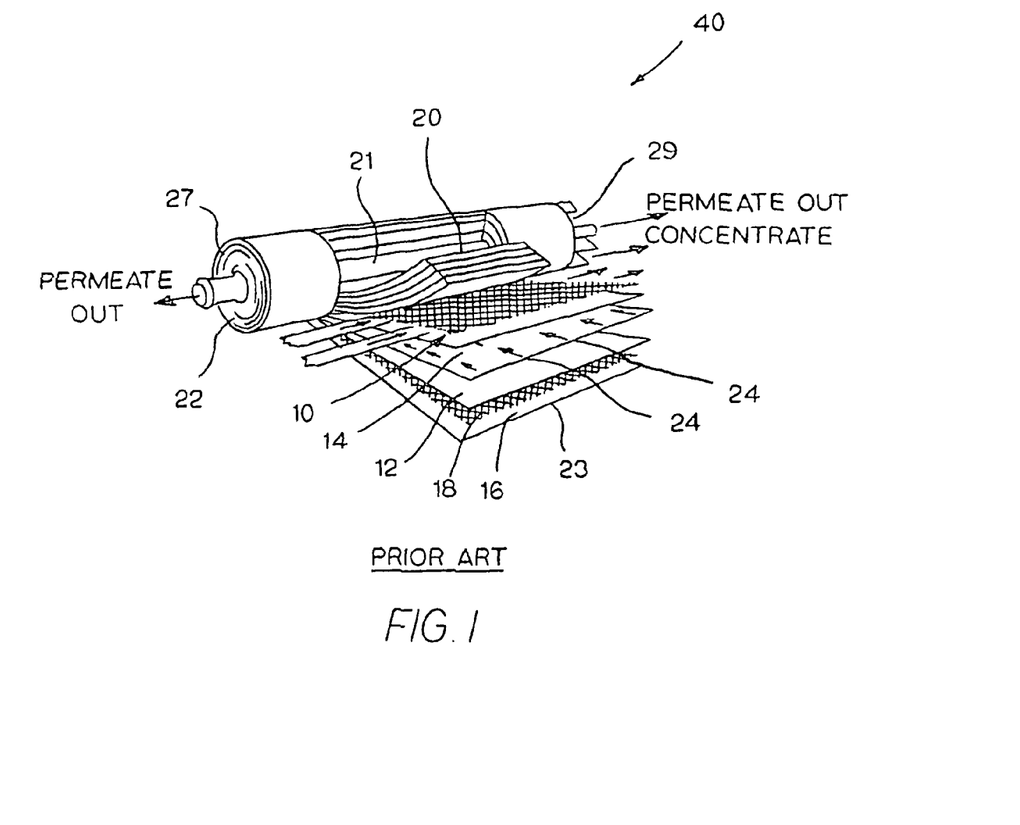
FIG. 1 is a perspective view of a typical prior art cross-flow filtration arrangement with the membrane layers partially cut away and spread out so they can be seen.

FIG. 1 is a view of a typical cross-flow filtration arrangement, with membrane layers 10, 12 partially cut away and unwound so they can be seen. The filter media is typically a spiral wound bundle which is arranged in several layers or leaves. Feed channel spacer layers 18 are coextensive with the surface of the adjacent membrane layers 10, 12 and provide the flow path for the feedstock, bringing it into contact with the feed side (or "feed surface") of two adjacent membrane layers 10, 12 as the feedstock flows through the material of the spacer layer 18. A permeate collection material layer 14 provides the flow path for the permeate which is leaving the permeate side (or "permeate surface") of two membrane layers 10, 12.

The feed solution is brought to the "feed surface" of two membranes 10, 12 by passing along the feed channel spacer layer 18 that lies between those two membranes. Some of the feed solution passes through the membranes 10, 12 and becomes the filtrate (if the membrane is a filter media) or permeate (if the membrane is a semi-permeable membrane). That portion of the feed solution which is not "filtered" through the membrane continues to pass along the feed, surface of the membrane and leaves the filter as concentrate. The portion of the feed solution that passes through the membranes 10, 12 to the permeate side is collected by the permeate collection material layer 14 and passes along the permeate side of the membranes 10, 12 to the collection tube 20.

Figure 2:
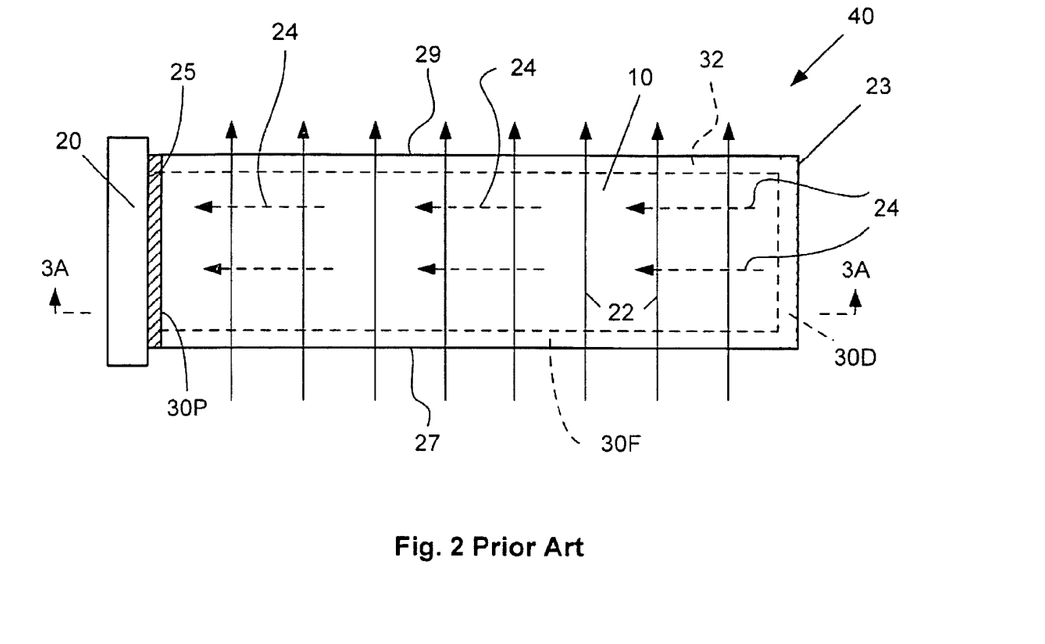
FIG. 2 is a schematic section view of the filtration arrangement of FIG. 1, looking down on one layer of membrane and showing the direction of flow of the feed stream along the feed channel spacer above the membrane and of the filtrate or permeate stream (in broken lines) along the permeate collection material below the membrane.
Figure 3:
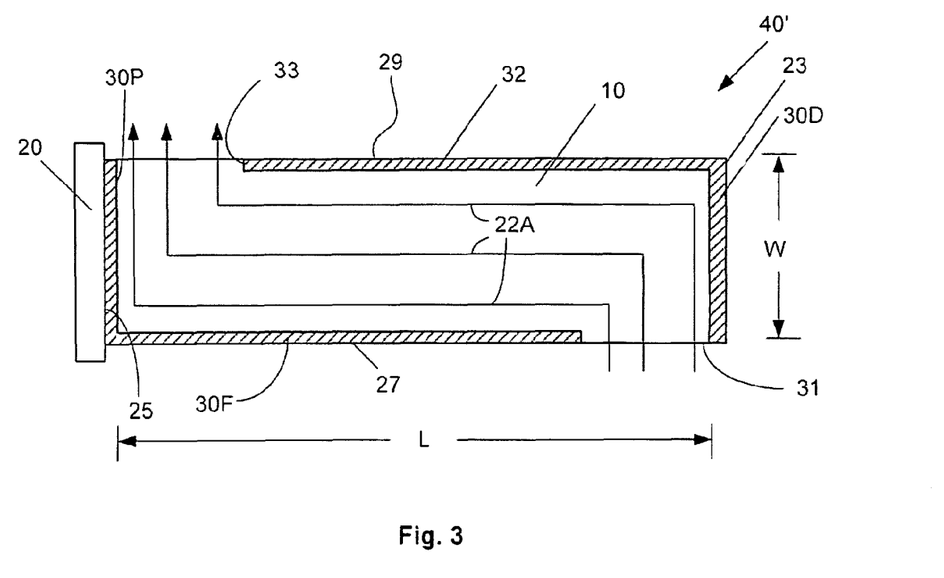
FIG. 3 is a schematic section view, similar to FIG. 2, but for a new flow arrangement.
Figure 3A:
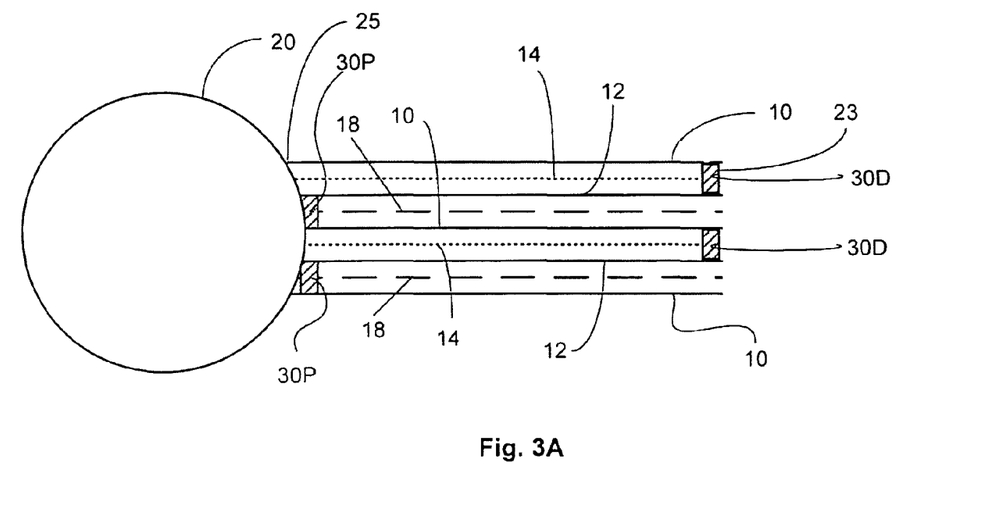
FIG. 3A is a schematic view along line 3A-3A of FIG. 2.

Referring briefly to FIGS. 2 and 3A, each of the layers of membrane 10, 12 has a proximal end 25 extending along the collection tube 20, a distal end 23 opposite the proximal end 25, a feed inlet end 27 and a concentrate outlet end 29. At the distal end 23, the membrane layers 10, 12 are glued together on the permeate side with a bead of glue 30D, sealing the distal end across the permeate collection layers 14 (as shown in FIG. 3A and as explained in more detail below). At the proximal ends 25, there are glued portions 30P along the feed channel spacer layers 18, which glue together the membranes 10, 12 on both sides of the feed channel spacer 18, and there are unglued portions along the permeate collection layers 14, to allow the permeate to flow along the permeate collection layers 14 into the collection tube 20.

The collection tube 20 has holes 21 (See FIG. 1) that allow permeate to pass into the center of the tube 20 to be collected. The permeate collection layers 14 also are sealed along the feed end 27 by means of a glue bead 30F and along the concentrate end 29 by means of a glue bead 32, so the only way fluid can get into the permeate collection layers 14 is by passing through a membrane, and the only way fluid can get out of the permeate collection layers 14 is by passing into the collection tube 20.

As shown in FIGS. 1 and 2, the feed stream passes along the feed channel spacers 18 parallel to the axis of the collection tube 20, as shown by the arrows 22, from the feed end 27 to the concentrate end 29 along the feed surfaces of the membranes 10, 12. There is a pressure differential between the feed surface and the permeate surface of each of the membranes 10, 12, with the pressure being higher along the feed channel spacers 18 than along the permeate collection material 14, so some of the feed solution passes through the membrane material 10, 12 and into the permeate collection material 14. The fluid that has passed through the membranes 10, 12 and into the permeate collection material 14 is called permeate, and the permeate flows along the permeate collection material 14 at right angles to the feed stream, in the direction of the arrows 24 (shown in broken lines FIG. 2 to indicate that they are below the membrane 10), toward the collection tube 20, in what is called a cross-flow arrangement.

The feedstock passing over the feed surfaces of the membranes 10, 12 preferably is moving at a high enough velocity to prevent build-up of the material that cannot pass through the membrane. Large pumps and large amounts of energy usually are required in order to generate those flow rates.

Figure 5:
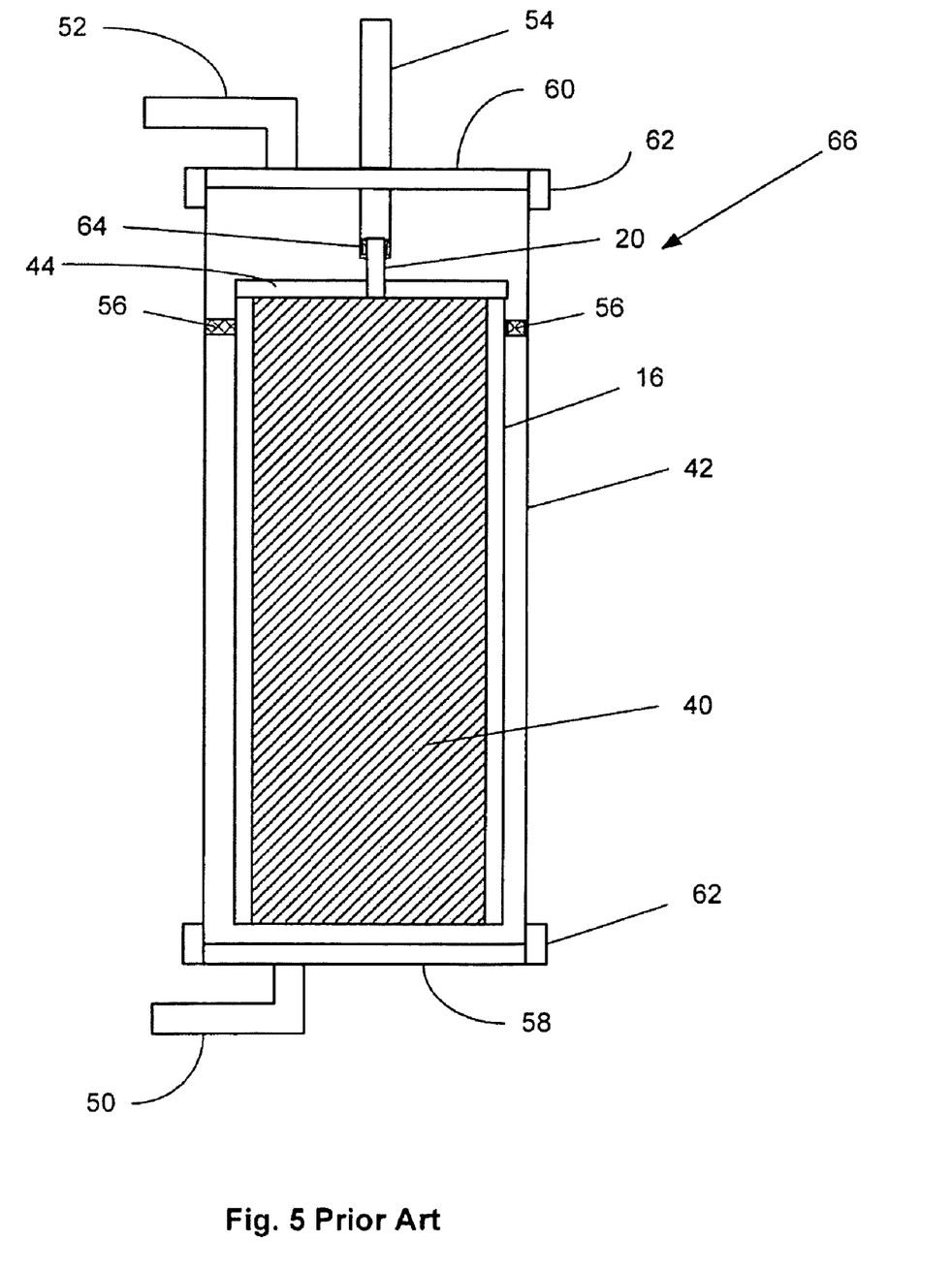
FIG. 5 is a section view of a prior art filter element, including a membrane bundle as shown in FIG. 1 and an anti-telescoping device as shown in FIG. 4.

The entire filter media bundle is encased in an impermeable outer covering 16, to form a filtration unit 40 (also referred to as a filter element 40), which in turn is typically encased in a pressure housing 42, as shown in FIG. 5. The housing 42 is typically made from PVC, fiberglass, or stainless steel, and one or more filter elements 40 may be housed in a single housing 42.

Figure 4:
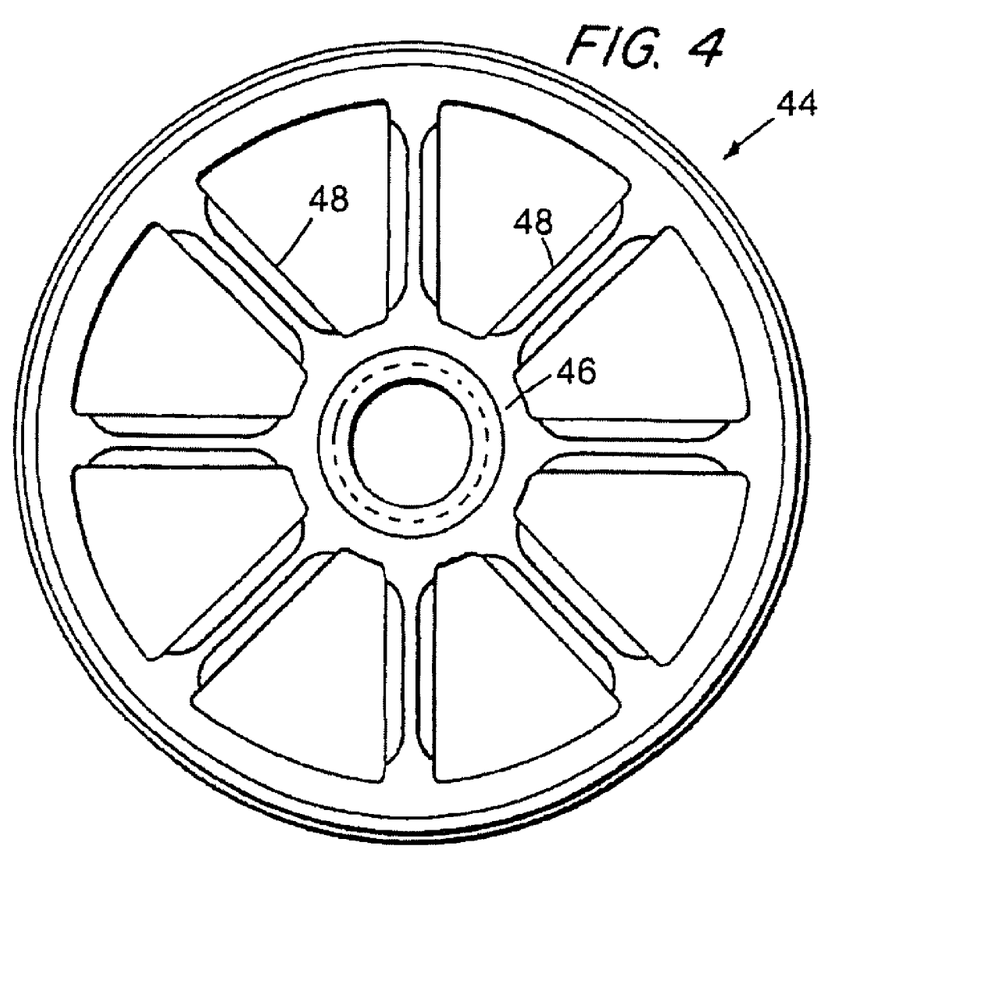
FIG. 4 is an end view of an anti-telescoping device which may be installed at one end or at both ends of a filter element.

FIG. 4 shows an anti-telescoping device 44 which may be installed at one end or at both ends of the filter element 40. The anti-telescoping device 44 resembles a spider web with a central hub 46 and spokes 48 extending radially from the hub 46. The purpose of the anti-telescoping device 44 is to prevent some parts of the spiral wound bundle of membranes 10, 12 from shifting axially relative to other parts due to the pressure of the feed water entering the filter element 40, which would cause the bundle to lengthen axially.

In the prior art, the entire filter element 40 is housed inside a housing 42 (See FIG. 5), which has a feed inlet port 50, a concentrate outlet port 52, and a permeate outlet port 54. The housing 42 includes end caps 58, 60 which are typically releasably secured to the housing 42 via clamps 62. Though not shown, the interface between the end caps 58, 60 and the housing 42 includes some type of a sealing device, such as a gasket or an O-ring, to ensure a leak-free connection.

There is typically an O-ring or a brine seal 56 between the housing 42 and the impermeable outer covering 16 of the filter element 40 to force the fluid to pass through the filter element 40 instead of bypassing the filter element 40.

The filter element 40 can be any width and length that is practical. In practice, in many applications, the filter elements 40 are approximately 48" wide and long enough to be from two inches to ten inches in outside diameter when rolled up. It is not unusual, such as in Reverse Osmosis (RO) applications for seawater desalination, to have four or even five filter elements 40 housed in series (end-to-end) in a single housing 42, wherein the permeate collection tubes 20 of the individual filter elements 40 are internally interconnected in series, and the concentrate exiting any given filter element 40 is the feedstock for the next filter element 40 in the series. The last filter element 40 in the series has its permeate collection tube 20 connected to the permeate outlet port 54, typically via an O-ring sealed connection 64, as seen in FIG. 5.

As may be appreciated from the foregoing description, there are numerous areas where an O-ring or seal failure can lead to operational problems in the prior art filter 66. For instance, if the brine seal 56 fails, feedstock can bypass the filter element 40 resulting in a reduction in permeate production. A failure of the permeate collection tube seal 64 may result in contamination of the permeate (which is at a lower operating pressure than the surrounding concentrate). Finally, a failure of the housing-to-endcap seals results in external leakage of the feedstock or concentrate.

An example of an improved filter element 40' is shown in FIG. 3. This filter element 40' changes the path along which the feed solution passes over the membranes 10, 12, so that, instead of taking a straight path 22 parallel to the axis of the collection tube 20 from the inlet end 27 to the outlet end 29, it takes a longer, more tortuous or labyrinth path 22A, having a smaller cross-sectional area, which creates a higher velocity along the inlet surfaces of the membranes for a given feed solution flow rate. The permeate side of the membranes 10, 12 in this embodiment is the same as in the prior art embodiment described above, with the permeate collection material 14 being sealed along the feed inlet end 27, the distal end 23, and the concentrate outlet end 29 and open along the proximal end 25 to allow permeate to flow into the collection tube 20.

Since the labyrinth path 22A has a smaller cross-sectional area than the flow path 22 of the prior art, if the same pumps are being used to pump the feed solution at the same flow rate, then the fluid will be flowing through the feed channel spacers 18 and along the feed surfaces of the membranes 10, 12 at a faster flow rate, greatly reducing the chance for fouling, so the filter will last longer. Alternatively, the flow rate may be greatly reduced, thereby requiring smaller pumps and less energy input, while still providing sufficient velocity across the feed surface of each membrane 10, 12 to avoid fouling of the membranes.

The labyrinth path is formed by creating barriers that extend between two adjacent membrane layers. The barriers confine the flow of the fluid through the feed channel spacer material 18 to the labyrinth path. As described below, the barriers may be formed in a variety of ways, such as by applying a bead of glue or by applying a gasket.

One way the labyrinth path may be formed is by the manner in which the membrane layers are glued together across the feed channel spacers 18 when the filter is being formed. Instead of allowing the feed solution to pass freely along the entire feed inlet edge 27 of the feed channel spacers 18, as shown in FIGS. 1 and 2, a bead of glue 30F extends across the feed channel spacers 18 along the feed inlet edges 27 of all the membranes 10, 12, extending from the collection tube 20 toward the distal end 23 of the membrane layers, which are also glued together along the glue beads 30D, leaving only a small inlet opening 31, through which the feedstock can pass into the filter 40', as indicated by the arrows 22A. The bead 30F prevents the feedstock from flowing into the membrane bundle anywhere except into the feed channel spacers 18 along the inlet opening 31.

Similarly, on the concentrate outlet end 29, another bead of glue 32 seals the feed channel spacers 18 from the glued-together distal end 23 toward the collection tube 20, leaving only a small outlet opening 33 through which the concentrate can pass out of the filter element 40'.

In this embodiment, the feedstock flows along a path 22A, which is parallel to the longitudinal axis of the collection tube 20 for only short distances adjacent the inlet opening 31 and outlet opening 33 and is, for most of its length, parallel to the direction of flow 24 of the permeate, which is substantially perpendicular to the axis of the collection tube 20 (as shown in FIG. 2). By making the feedstock flow over a labyrinth path as opposed to a straight-line path, the distance it travels from the inlet 31 to the outlet 33 is substantially greater than the width W of the leaves, which was the distance over which the feedstock flowed in the prior art arrangement of FIG. 2, and the cross-sectional area through which the feedstock flows is substantially smaller than in the arrangement of FIG. 2, thus causing the flow rate across the feed side of the membranes 10, 12 to be higher for a given feed rate.

Since the width "W" of the filter material is substantially less than the length "L", and since the feed fluid now flows primarily lengthwise instead of widthwise, the cross-sectional area over which the feedstock in FIG. 3 now must flow, which is "W" times the thickness of the feed channel spacer 18, is substantially less than the cross-sectional area traversed by the feedstock in FIG. 2, which was "L" times the thickness of the feed channel spacer 18. This means that, for a given feed rate of feedstock, the velocity over the membranes 10, 12 is much higher. Preferably, the cross-sectional area through which the feedstock flows along the tortuous path is one-half or less of the cross-sectional area through which it would have flowed for the prior art arrangement, and more preferably less than one-third the cross-sectional area for the prior art arrangement.

It may be advantageous to have more than one unglued section 31, 33 per roll to prevent excessive friction losses. Also, thicker spacers 18 may be used to reduce friction losses. In practice, there are usually several layers of membrane per roll to reduce friction losses in the permeate chamber.

Figure 3B:
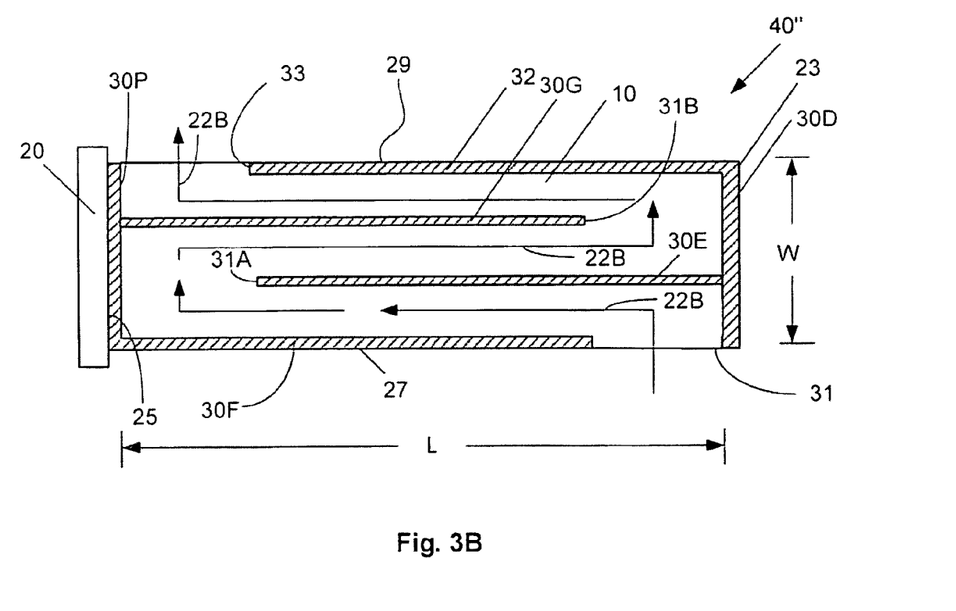
FIG. 3B is a schematic section view, similar to FIG. 3, but for an alternative flow arrangement.

While the path shown in FIG. 3 is quite simple, it may be made more of a labyrinth, forcing the feed stream to flow back and forth over the membranes 10, 12 in any desired pattern, simply by using beads of glue to create the labyrinth path. FIG. 3B shows an alternative embodiment 40" in which two additional glue beads 30E, 30G have been added parallel to the inlet bead 30F and the outlet bead 32. The glue bead 30E extends from the distal end 23 toward the proximal end 25, leaving an opening 31A, and the glue bead 30G extends from the proximal end 25 toward the distal end 23, leaving an opening 31B. In this case, the fluid flows through the feed channel spacer 18 along the path shown by the arrows 22B, traversing the length L of the membranes 10, 12 three times before leaving the filter. In this embodiment, the cross-sectional area over which the feed fluid flows is one-third of W times the thickness of the feed channel spacer 18, or one-third of the cross-sectional area of the embodiment in FIG. 3, and, depending upon the ratio of W to L, it may be one-sixth or less of the cross-sectional area of the prior art design shown in FIG. 2.

A second way the labyrinth path may be formed is by replacing the beads of glue 30F, 30E, 30G, 32 described above (in FIGS. 3 and 3B) with similarly placed and shaped gaskets which accomplish the same task of creating a seal and redirecting the feed water stream to follow a less direct, more tortuous path, which also induces a higher velocity over the membranes 10, 12, providing more scouring or cleaning action along the feed surfaces of these membranes 10, 12.

Figure 6:
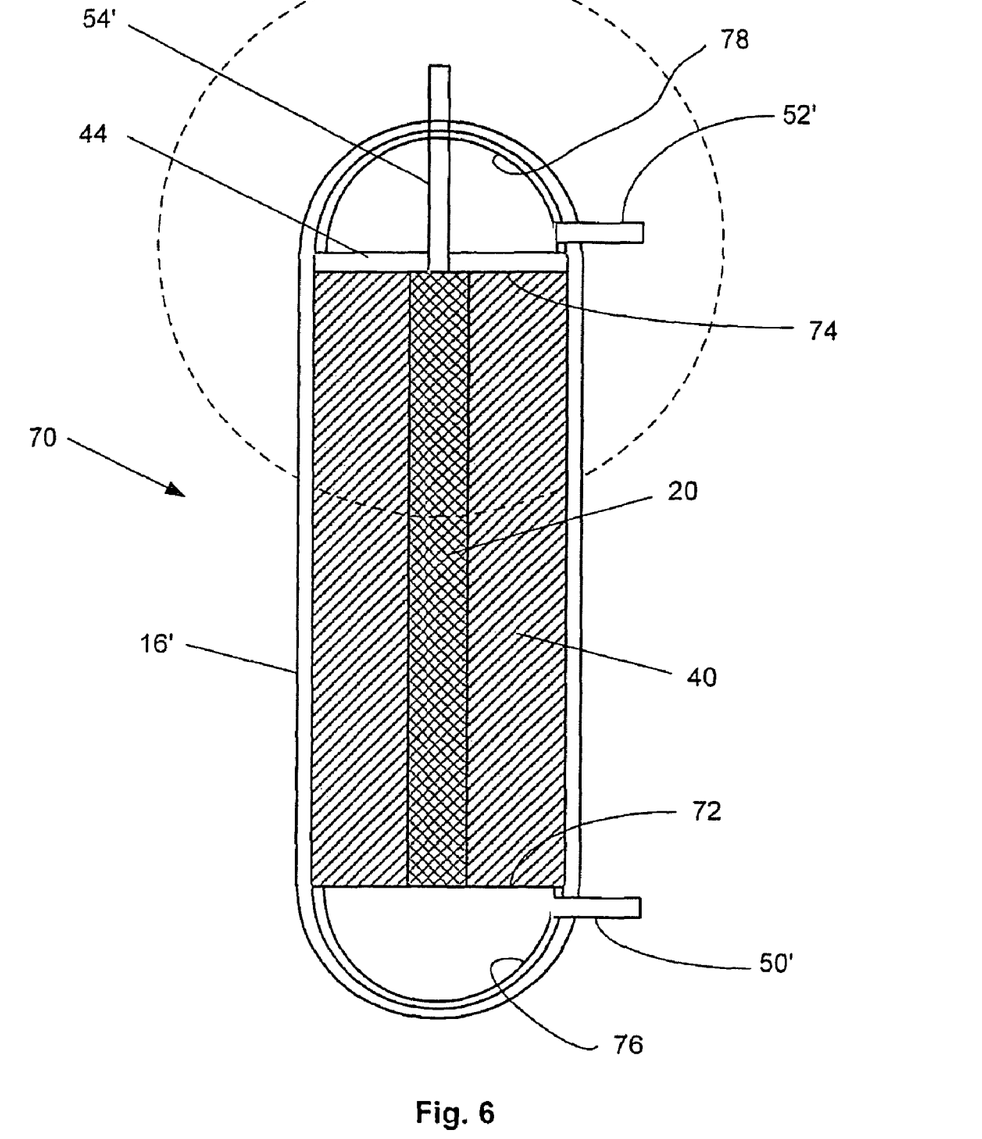
FIG. 6 is a section view, similar to FIG. 5 but for a new filter arrangement.
Figure 7:
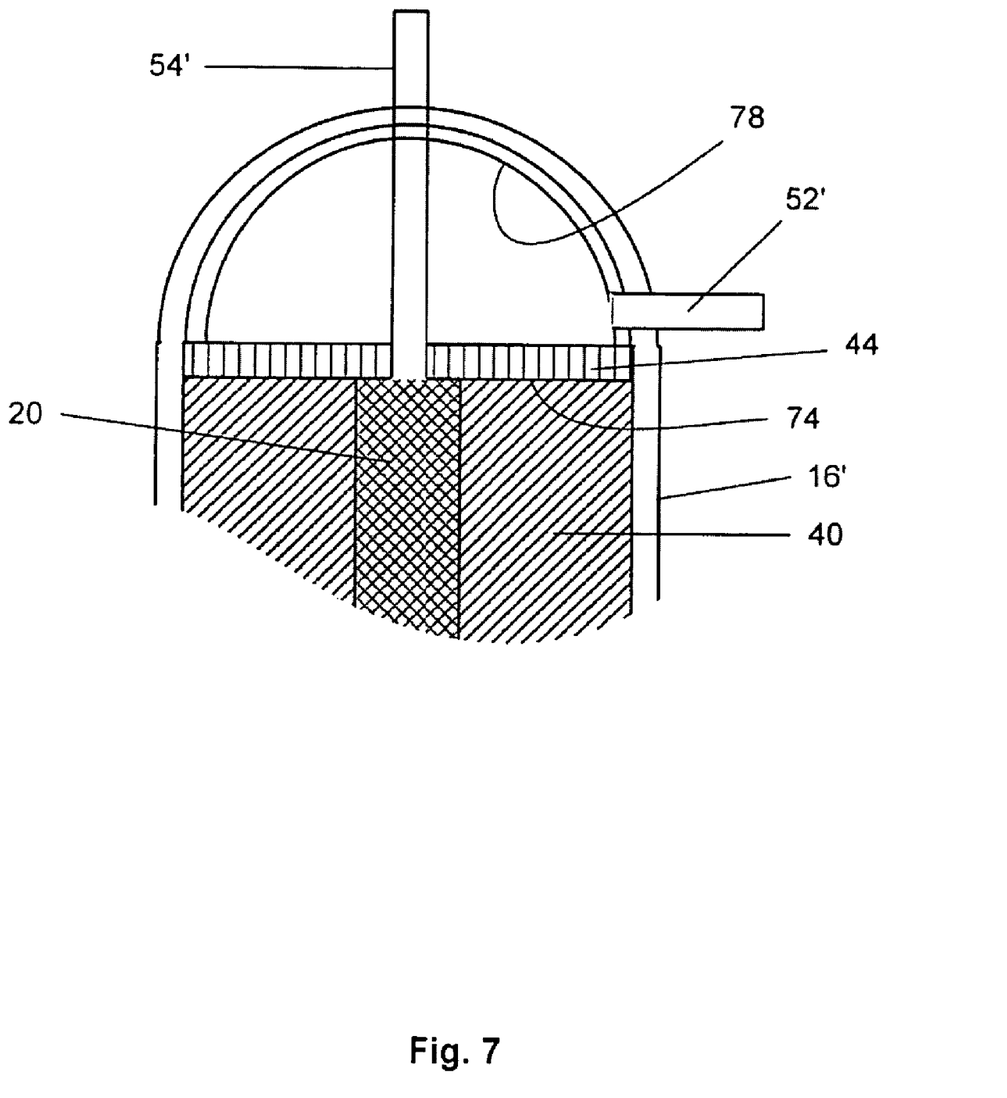
FIG. 7 is an enlarged view of the detail area of the upper portion of the filter of FIG. 6.

FIGS. 6 and 7 are cross-sectional views of a filter 70 which solves many of the leakage problems of prior filters, such as the filter shown in FIG. 5. Comparing the view in FIG. 6 with the corresponding cross-sectional view of a prior art filter 66 in FIG. 5, it may be seen that this new filter 70 has fewer parts with simpler construction and less opportunity for seal failure.

FIG. 6 shows that this new filter 70 may use a "traditional" prior'art filter element 40 with a straight path, as discussed above and depicted in FIGS. 1 and 2, or it may use a filter element 40' or 40" with a labyrinth or tortuous path, as disclosed above and depicted in FIGS. 3 and 3B.

Referring to FIGS. 6 and 7, the filter 70 includes a filter element 40 (or 40' or 40" as discussed above) defining first and second ends 72, 74 respectively, an anti-telescoping device 44 (which may be present at both ends 72, 74 of the filter element 40, if desired), and end caps 76, 78 at the respective ends 72, 74 of the filter element 40. In this instance, the end caps 76, 78 are hemispherical, but they could have other geometries if desired.

The permeate outlet port 54' projects through the end cap 78 and is fused or glued) directly to the permeate collection tube 20 (or may be the permeate collection tube 20 itself), thus eliminating a potential leakage area, such as the seal area 64 in the prior art, seen in FIG. 5. This permeate outlet port 54' also is sealed (either via a mechanical seal or by glue) to the end cap 78 to ensure no leakage to the outside of the filter 70.

Similarly, the feedstock inlet port 50' and the concentrate outlet port 52' project through their respective end caps 76, 78. In one embodiment, these ports 50', 52' are fittings which are threaded into predrilled and threaded openings in the end caps 76, 78 respectively, or they may be inserted and glued into predrilled openings in the end caps 76, 78.

The entire assembly including the filter element 40, 40' or 40", the anti-telescoping device(s) 44, the end caps 76, 78, and the ports 50', 52', 54' is encased in an outer covering 16', which takes the place of the covering 16 of FIGS. 1 and 2 as well as covering the end caps 76, 78. This outer covering 16' preferably is made of filament wound fiberglass which is wound over the entire unit and conforms to its shape, resulting in a unitary outer covering that is adhered to the outer surface of the filter element 40 (or 40' or 40") along substantially the entire outer surface of the filter element 40 (or 40' or 40"), leaving no space between the covering 16' and the filter element through which fluid could leak. This outer covering 16' is thick enough to support the internal operating pressure of the filter element.

It should be noted that, for added integrity and to ensure a watertight seal at some of the connections (such as the connections of the ports 50', 52', 54' to the end caps 76, 78), it may be desirable to glue the components prior to applying the outer covering 16'. Also, it is understood that, even though the ports 50', 52', 54' are also surrounded by this outer covering 16', the ports 50', 52', 54' project through the outer covering 16' to provide passageways for fluid from the inside to the outside of the filter 70. Of course, it could also be possible to apply the outer covering 16' prior to the installation of the ports 50', 52', in which case both the end caps 76, 78 and the outer covering 16' would be drilled through for the later installation of these ports 50', 52'.

An alternate manufacturing procedure is for the filter element 40, 40', or 40" to be slid into a housing 16" (preferably a thermoplastic housing) (See FIG. 8) which is simply an elongated, cylindrical member with two open ends. This housing 16" is designed to be too small to accommodate the filter element 40, such that the housing 16" must be heated until it expands sufficiently to allow the filter element 40 (or 40' or 40") to slide into the housing 16". As the housing 16" cools down, it contracts to its original diameter, conforming to the shape of the filter element and sealing tightly over substantially the entire cylindrical outer surface of the filter element. Glue or sealant may be added between the housing 16" and the filter element to ensure a tight seal along the entire adjoining surfaces, with no possibility of the feedstock bypassing the filter element.

Figure 8:
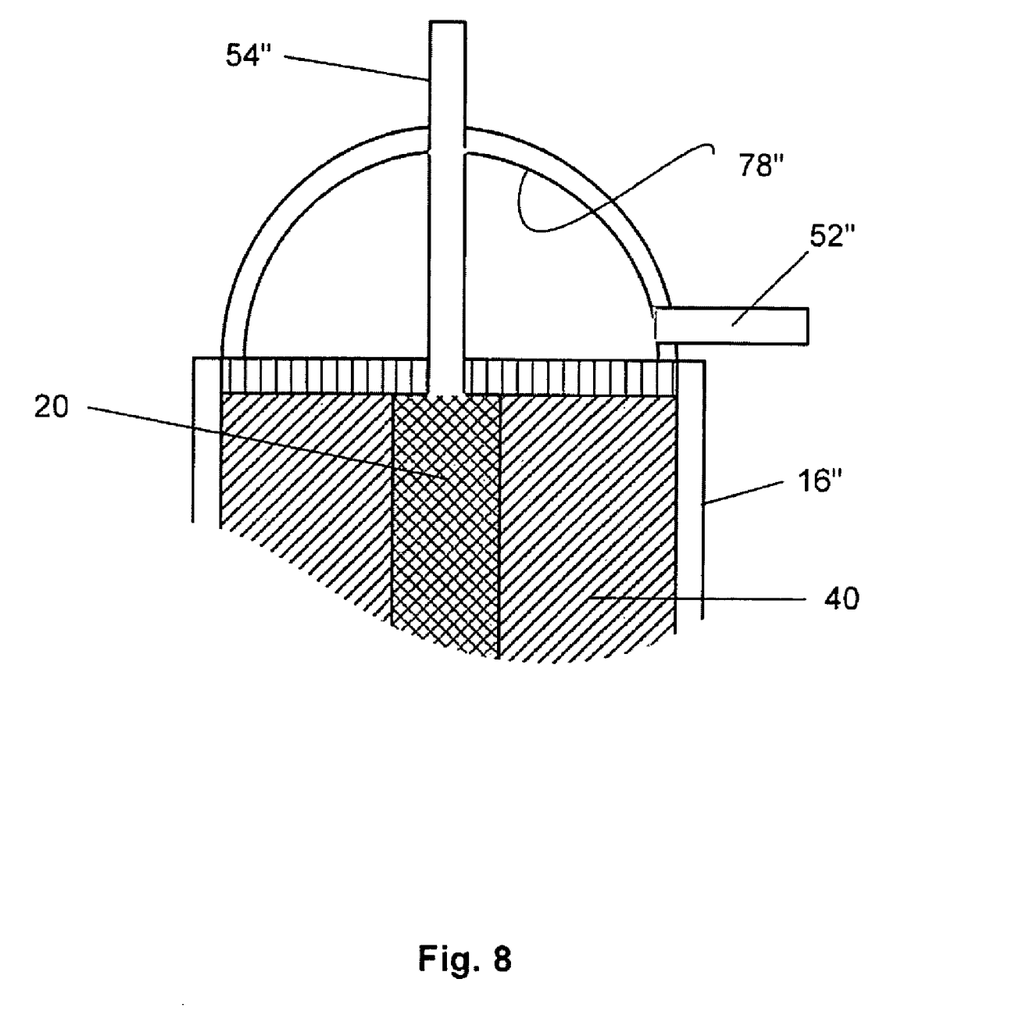
FIG. 8 is a view similar to FIG. 7 but for another embodiment of a filter.

Alternately, the housing 16" could be made of any suitable material, and a suitable potting material could be pumped into the space between the filter element 40 (or 40' or 40") and the housing 16" to fill that space. The housing 16" is strong enough to withstand the internal pressure of the fluid passing through the filter element, as was also the case for the housing 16' described above.

Once the filter element 40 (or 40' or 40") is fixedly secured to the housing 16", the ports, such as the permeate port 54", and the end caps, such as the end cap 78',' are secured to the assembly by gluing, welding, or other permanent means, resulting in a unitary covering that conforms to the shape of the filter element and is sealed to the outer surface of the filter element along substantially its entire cylindrical outer surface.

Figure 9:
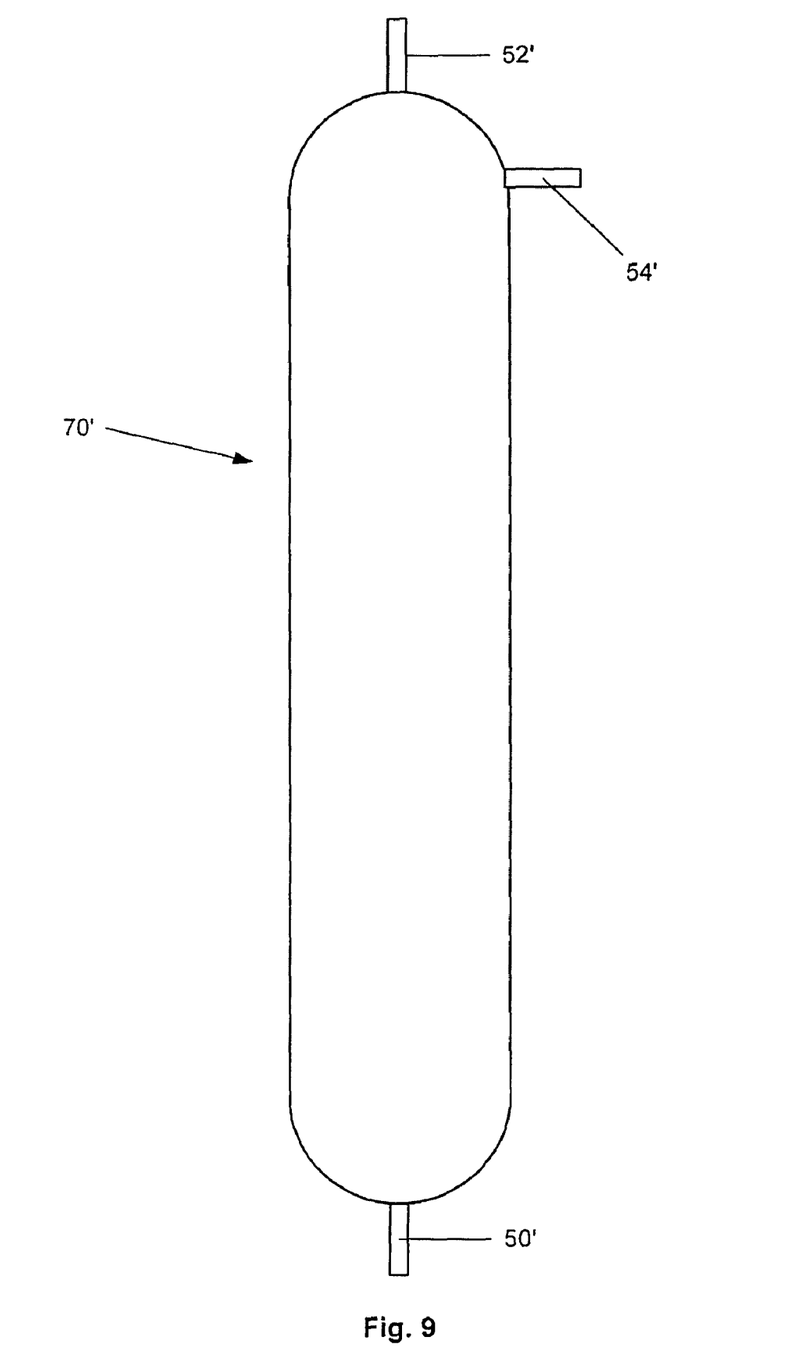
FIG. 9 is a side view of the filter of FIG. 6, but showing an alternate configuration of the ports which may facilitate the linear placement of the filters in a series configuration.

Referring briefly to FIG. 9, it should be noted that the location of the ports 52', 54' in FIG. 7 (or of the ports 52", 54" in FIG. 8) may be exchanged, such that the permeate outlet port 54' projects radially out of the side of the filter 70' and the concentrate outlet port 52' projects axially out of the end of the filter 70'. Likewise, the feed inlet port 50' may also be relocated so it also projects axially out of the end of the filter 70'. This design change facilitates the linear placement of the filter 70' in a series configuration, with the concentrate outlet port 52' of one filter 70' feeding directly into the feed inlet port 50' of the following filter 70'.

With such an arrangement, the opportunity for leakage between the filter element 40 (or 40' or 40") and the housing 16' (or 16") is greatly reduced from prior art arrangements. Also, if the units 70, 70' are arranged in series and there is a problem with any of the filterelements 40, that problem can readily be detected and that individual unit 70, 70' may be replaced easily, without having to replace all the units 70, 70' that are connected together in series.

It will be obvious to those skilled in the art that modifications may be made to the embodiments described above without departing from the scope of the present invention.

What is claimed is:

1. A spiral wound filter, comprising:
   a collection tube having a first end and a second end, and defining a longitudinal axis;
   at least one membrane wound around said collection tube, said membrane defining a feed surface and a permeate surface; a proximal end adjacent to said collection tube; a distal end opposite the proximal end; a feed inlet end adjacent the first end of the collection tube; a concentrate outlet end adjacent the second end of the collection tube; a width dimension from the feed inlet end to the concentrate outlet end; and a length dimension from the proximal end to the distal end;
   a layer of feed channel spacer material adjacent to and coextensive with the feed surface, and barriers formed along said feed channel spacer layer material which constrain the flow of fluid through said feed channel spacer layer material to a labyrinth fluid flow path from a feed inlet opening at the feed inlet end to a concentrate outlet opening at the concentrate outlet end, said labyrinth fluid flow path being substantially longer than the width dimension.

2. A spiral wound filter as recited in claim 1, wherein said feed channel spacer layer has a thickness; and wherein a substantial portion of said fluid flow path has a cross-sectional area less than one-half of the thickness of the feed channel spacer layer times the length dimension.

3. A spiral wound filter as recited in claim 2, wherein one of said feed inlet opening and concentrate outlet opening is adjacent said proximal end and the other of said feed inlet opening and concentrate outlet opening is adjacent said distal end.

4. A spiral wound filter as recited in claim 2, wherein said barriers are formed by beads of glue sealing across said feed channel spacer layer material.

5. A spiral wound filter as recited in claim 2, wherein said barriers are formed by gaskets sealing across said feed channel spacer layer material.

6. A spiral wound filter, comprising:
   a filter element, including
   a permeate collection tube having a first end and a second end and defining a longitudinal axis; and
   at least one membrane wound around said collection tube to form an outer surface, said membrane having a feed surface and a permeate surface; a proximal end adjacent to said collection tube, a distal end opposite the proximal end; a feed inlet end adjacent the first end of the collection tube, and a concentrate outlet end adjacent the second end of the collection tube and defining a length dimension from the proximal end to the distal end, a width dimension from the feed inlet end to the concentrate outlet end; and an outside diameter dimension;
   a first end cap adjacent said first end, said first end cap defining a feed inlet port;
   a second end cap adjacent said second end, said second end cap defining a concentrate outlet port; and
   a housing encasing said filter element and said end caps, said housing being sealed against said filter element along substantially the entire outer surface of the filter element.

7. A spiral wound filter as recited in claim 6, wherein each of said first and second end caps defines an external surface, and said housing is sealed against substantially the entire external surface of said end caps.

8. A spiral wound filter as recited in claim 6, wherein said first and second end caps are permanently affixed to said feed inlet end and said concentrate outlet end, respectively.

9. A spiral wound filter as recited in claim 6, and further comprising a permeate outlet port extending through one of said end caps and permanently affixed to said collection tube.

10. A spiral wound filter as recited in claim 9, and further comprising an anti-telescoping device adjacent at least one of said feed inlet end and said concentrate outlet end.

11. A spiral wound filter as recited in claim 9, wherein said concentrate outlet port is substantially parallel to said longitudinal axis and said permeate outlet port is substantially orthogonal to said longitudinal axis.

12. A spiral wound filter as recited in claim 6, wherein said filter element includes a feed channel spacer layer coextensive with and adjacent to the feed surface of the membrane, said feed channel spacer layer having a thickness and defining a fluid flow path from the feed inlet end to the concentrate outlet end, a substantial portion of which has a cross-sectional area less than one-half of the thickness of the feed channel spacer layer times the length dimension.

13. A spiral wound filter as recited in claim 12, wherein said fluid flow path is defined by glue sealing across the feed channel spacer layer.

14. A spiral wound filter as recited in claim 12, wherein said fluid flow path is defined by a gasket sealing across the feed channel spacer layer.

* * * * *